Patented Dec. 24, 1929

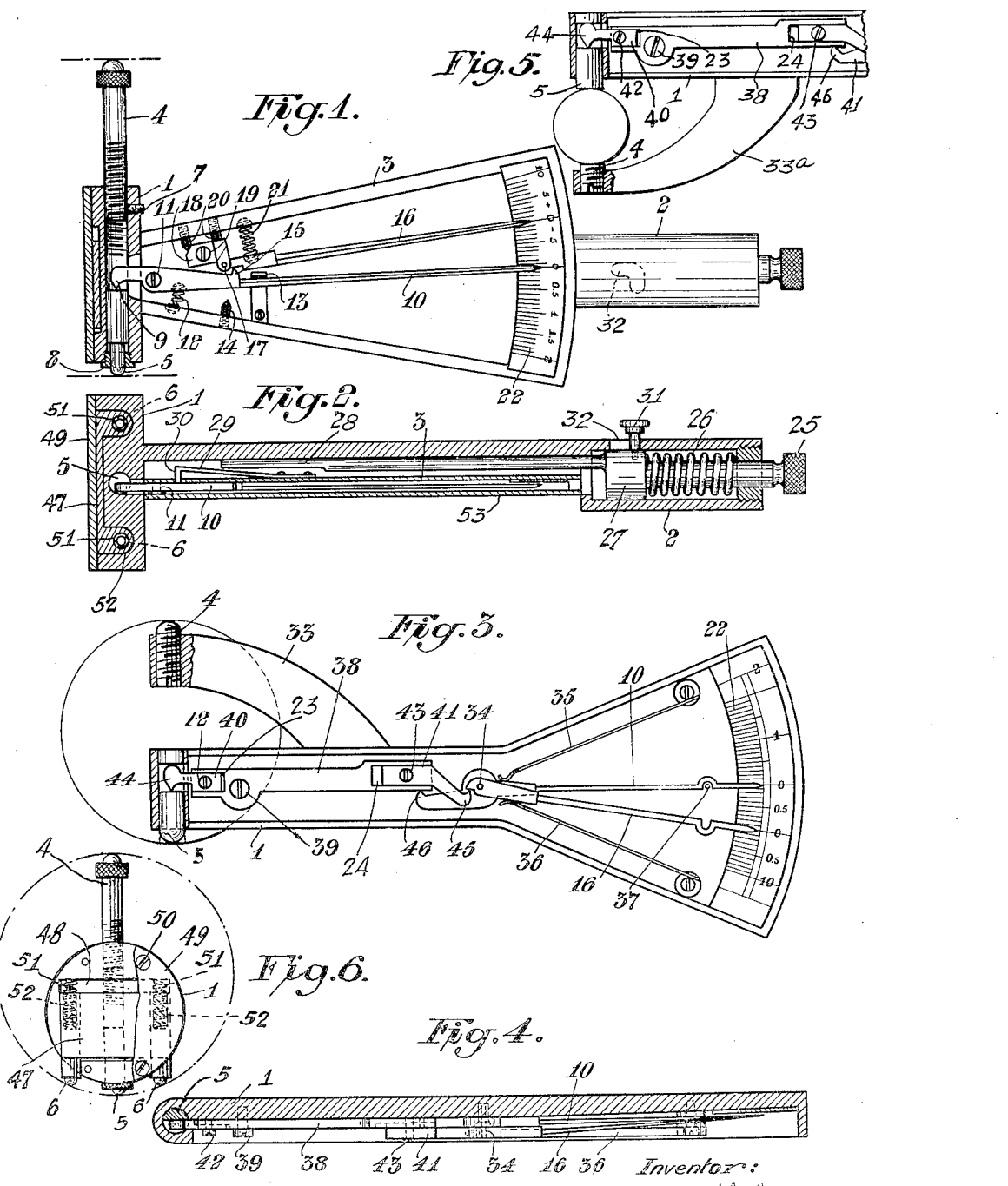

1,740,695

UNITED STATES PATENT OFFICE

CARL EDVARD JOHANSSON, OF DETROIT, MICHIGAN

GAUGE

Application filed April 12, 1923, Serial No. 631,499, and in Sweden April 27, 1922. Renewed September 12, 1928.

The present invention relates to an improvement in gauges of the kind which consist of a head or similar body secured to a suitable handle, and in which there are provided a fixed or adjustable measuring stud and a sliding measuring stud located in alignment with the first-named stud, said two studs being adapted during the measuring to be placed in contact with the objects to be measured, and which gauges are provided with two pointers one of which serves for the preliminary or rough measurement, for instance during the first stages of the working, and is actuated by the sliding measuring stud, and the other of which serves for the accurate measurement and is actuated through a gear mechanism so that it gives a greater deviation than the first named pointer for the same movement of the measuring stud. The object of the invention is to provide a gauge of this kind which shall have small dimensions and yet possess a large measuring range and which simultaneously renders possible very accurate measurements within a certain portion of said measuring range where particularly great accuracy is desired. For this purpose the invention consists broadly in that the gear mechanism is so constructed that the accurate measurement pointer moves only when the pointer actuated by the sliding measuring stud moves in the vicinity on both sides of the zero point on a scale for said pointer, but is released and will therefore be at rest during the other movement of the rough measurement pointer. In this manner it is possible to use a comparatively short scale and thus to obtain small dimensions of the gauge, and in addition the important advantage is also attained that, for instance when measuring a piece of work in the course of its manufacture, the accurate measurement pointer will begin to move only when the rough measurement pointer approaches the correct measure and thus indicates to the machinist that the piece of work approaches the correct measure, so that greater caution must be observed during the rest of the operation.

The present invention also contemplates a further improvement of the indicating device for the purpose of making possible a simpler and less expensive manufacture of the same and to render it possible to make the gauge of such shape that its range of usefulness will be increased. For this purpose the two pointers are pivoted on a common axis and are actuated by a lever inserted between said pointers and the sliding measuring stud, the one short arm of said lever being actuated by the measuring stud, and different lengths of the other longer arm of said lever actuating the two pointers in such manner that one of said pointers performs a greater movement than the other pointer for the same movement of the measuring stud. By this insertion of a lever between the measuring stud and the two pointers it is possible to make the narrow portion of the gauge nearest to the measuring stud of a sufficient length for making it possible to measure also long holes of small diameter, and the serviceableness of the gauge is thus increased.

The accompanying drawings illustrate by way of example two embodiments of the invention. Fig. 1 shows a gauge for measuring internal dimensions constructed according to the invention, in side elevation and in section through the head on the common axis of the two measuring studs, and Fig. 2 shows a longitudinal section of the gauge. Fig. 3 shows a side elevation, partly in section, of a second embodiment, of which Fig. 4 shows a longitudinal section. Fig. 5 is a fragmentary view showing a modification of the embodiment illustrated in Fig. 3 adapted for measuring external dimensions. Fig. 6 is an end elevation of the gauge shown in Figs. 1 and 2.

The gauge illustrated in Figs. 1 and 2 consists of a head 1 which is secured to a hollow shaft 2 the portion of which adjacent the head 1 is formed as a box 3 covered by a transparent cover 53, said box containing a gear mechanism and two pointers with corresponding scales. In the head 1 there are provided an adjustable measuring stud 4, a sliding measuring stud 5 and two sliding, locating studs 6. The adjustable measuring stud 4 is screwthreaded into the head and may be locked in its position after adjustment for instance by means of a set screw 7. The movable measuring stud 5 slides freely with its inner thick part in a bore in the head 1, while its outer portion which is of a slightly smaller diameter, slides in the bushing 8 which is screw-threaded into the head and which simultaneously serves to prevent the measuring stud from dropping out of the head. Against the inner plane end of the measuring stud the knife-shape extension 9 of a pivoted arm bears. Said arm carries a pointer 10 and is pivoted on the screw 11 which is threaded into the bottom of the box 3, and the pointer is actuated by a spring 12 which maintains the edge 9 bearing against the inner end surface of the measuring stud 5. The spring 12 tends to turn the pointer 10 to bear against a stop 13 projecting from the bottom of the box. A pressure inwards on the measuring stud 5 will move the pointer 10 away from said stop until its movement is finally checked by a stop screw 14 screw-threaded into the side wall of the box 3.

On the side of the fulcrum 11 opposite the edge 9 the pointer arm is provided with a second edge 15 directed in the opposite direction, by means of which edge the pointer actuates a second pointer 16 of slightly shorter length. Said pointer 16 is pivoted on a pin 17 in a bearing 18 which is secured by means of a screw 19 to the bottom of the box 3 and which may be adjusted in proper position by means of two set screws 20. A coil spring 21 maintains the pointer 16 in engagement with the edge 15 and tends to turn the pointer against the stop 13. The edge 15 engages the pointer 16 in a plane through the point of the pointer and its axis of rotation 17. When the measuring stud 5 is free and left to itself the spring 12 determines the position of said measuring stud as well as the positions of the two pointers 10 and 16, the spring 12 being stronger than the spring 21, so that the edge 15 on the pointer 10 moves aside the pointer 16.

The two pointers 10 and 16 move over separate portions of a scale 22 which is provided with two zero points, one for each pointer. The gear mechanism between the two pointers is so dimensioned, in the embodiment illustrated, that when the pointer 10 points to the zero point on the lower half provided for the same of the scale 22 in Fig. 1, the pointer 16 also points to the zero point on the upper portion provided for the same of the scale, and that for the same movement of the measuring stud 5 the point of the pointer 16 moves through ten times the distance covered by the point of the pointer 10, so that if, for instance, the movement of the pointer 10 from one line to the next on the lower half of the scale represents a movement of the measuring stud 5 of 0.1 mm., the movement of the pointer 16 from one line to the next on the upper half of the scale represents a movement of the measuring stud 5 of 0.01 mm. The pointer 10 will therefore be used for rough measuring, whereas the pointer 16 will be used for the final accurate measure. In accordance herewith the pointer 16 takes part in the movement only when the pointer 10 moves between the two lines on each side nearest to the zero point on the lower half of the scale, whereas during the movement of the pointer 10 over the remaining portion of the lower half of the scale the pointer 16 is at rest bearing against the stop 13. By this arrangement of two pointers cooperating in the manner above described the essential advantage is attained that with a comparatively short scale and short pointers and consequently small dimensions of the box 3 it is possible to take rough measures within a large measuring range, for instance during the first stage of the working, and also accurate measurements with very great accuracy within that portion of the measuring range of the gauge where the greatest accuracy is required, that is to say in the immediate vicinity of the correct measure which is attained when both pointers point to their respective zero points.

In certain cases it may be desirable to be able to lock the pointer 10 in any position on the scale 22, and in order to render this possible there is provided a locking device in the tubular shaft 2 of the gauge. Said device consists of a piston 27 movable in the cylindrical cavity of the shaft 2 and actuated by a coil spring 26. To said piston 27 a rod 28 is secured eccentrically, said rod extending behind the bottom of the box 3 to a flat spring 29 secured at one end to said bottom. Said spring 29 is provided at its other end with a portion 30 bent approximately at right angles to the spring and projecting into an opening in the bottom of the box 3, in the vicinity of the screw 11. When the piston 27 is allowed to move to the left in Fig. 2 under the actuation of its spring 26, the end of the rod 28 actuates the spring 29 and forces the portion 30 of the same through the opening in the bottom of the box and against the pointer 10 which is thus forced against the head of the screw 11. When the piston 27 is pulled back, to the right in Fig. 2, by the aid of a knurled head 25 on a reduced portion of said piston, the rod 28 releases the spring 29 which in its turn releases the pointer 10. In this retracted position the piston 27 may be locked against the action of the spring 26 by slightly turning said piston 27 so that the neck of a button 31 secured to the piston and projecting through an angular slot 32 in the wall of the shaft 2, is moved into the portion of said slot 32 which is perpendicular to the longitudinal direction of the shaft 2. If it is desired, while measuring, to fix the position of the pointer 10 on the scale 22, it is only required to turn the piston 27 so that the button 31 moves out of the said portion of the slot 32, after which the spring 26 moves the piston 27 to the left in Fig. 2, so that the rod 28 forces the portion 30 of the spring 29 against the pointer 10 with the result that said pointer 10 and thus also the pointer 16 are locked in their respective positions.

When the gauge described is to be used for measuring it is first introduced into a snap gauge formed or built up of standard measuring blocks and shanks, or into a standard ring of the desired exact dimension. The adjustable measuring stud 4 is now turned until both pointers 10 and 16 point to their respective zero points, after which the measuring stud 4 is locked in its position thus determined. By means of the gauge adjusted in this manner it is afterwards possible to observe the making of a hole or a slot in a piece of work, while said piece is secured in the machine, from the time when about 2 mm. remain until the attaining of the desired measure, and when the machining has been finished it is possible to ascertain whether the diameter of the hole or the width of the slot is exactly equal to the standard measure or otherwise is within the allowances over or under size.

In measuring a hole, such as indicated by the dot and dash circle in Fig. 6, for example, both measuring studs 4 and 5 should be on the same diameter so that the correct dimension will be obtained. Such locating of the gauge in the correct position is considerably facilitated by the two locating studs 6, which are secured to a sliding plate 47 located in a recess 48 in the head 1 and covered by a cover 49 secured to the head by screws 50. Said plate is pressed outwardly by two strong coil springs 51, located in bores 52 in said plate and pressing against the bottoms of said bores and against the upper wall of said recess 48, thus tending to move the studs 6 in a downward direction, as shown in Fig. 6, so that their outer ends will bear against the wall of the hole and thus center the instrument.

In the embodiment above described the box 3 is arranged in such manner that its center line is perpendicular to the common axis of the two measuring studs. Such arrangement, however, is not necessary, as it is of course also possible, if desired or suitable for any special purpose, to arrange the box more or less obliquely to said axis.

The gauge illustrated in Figs. 3 and 5 is also provided with an adjustable measuring stud 4 and a sliding measuring stud 5 which are located in alignment, the latter in the body 1 and the former in an arm 33 projecting from said body, and also with two pointers 10 and 16 which are movable over different portions of the scale 22, and the former of which is used for rough measuring and the latter of which serves for the final accurate measuring. Both pointers are rotatable on a common pivot 34 secured in the body 1, and each pointer is actuated by a flat spring 35 and 36 respectively which tend to move the pointers against a stop pin 37. According to the invention there is inserted a lever 38 between the sliding stud 5 and the two pointers, said lever being pivoted on a screw 39 secured in the body 1, and the short arm of the lever being actuated by the measuring stud 5 while the long arm of the lever actuates the two pointers.

In order to render possible adjustment of the ratio between the movements of the measuring stud and the pointers the lever is provided at both ends with slides 40 and 41 which are movable in longitudinal slots 23 and 24 respectively in the lever and may be secured in adjusted positions by means of screws 42 and 43. The slide 40 at the end of the short arm of the lever carries an edge 44 which bears against a plane shoulder on the measuring stud 5, so that when the measuring stud slides the lever 38 will be turned. The slide 41 at the end of the long arm of the lever carries in similar manner an edge 45 which bears against a plane surface on the accurate measurement pointer 16. The rough measurement pointer 10, on the other hand, bears with an edge 46 directly against the lever 38. By adjusting the slide 40 it is thus possible to adjust the ratio between the movements of the measuring stud 5 and the rough measurement pointer 10, and by adjustment of the slide 41 it is possible to adjust the ratio between the movements of the two pointers.

As in the first embodiment the pointers 10 and 16 move over different portions of the scale 22 which is also in this embodiment provided with two zero points, one for each pointer. The gearing between the two pointers is arranged in such manner that when the pointer 10 points to the zero point on the upper portion of the scale, the pointer 16 also points to the zero point of the lower half of the scale, and the gearing may be so adjusted in the manner above described that for the same movement of the measuring stud 5 the point of the pointer 16 moves through ten times the distance covered by the point of the pointer 10. Also in this case the accurate measurement pointer 16 performs movement only during the movement of the rough measurement pointer 10 in the vicinity on both sides of the upper zero point on the scale, and will then reproduce the simultaneous movement of the pointer 10 in an enlarged scale, whereas during the movement of the pointer 10 over the remaining portion of the upper half of the scale, that is to say before the accurate measuring is to begin, the pointer 16 is at rest and bears against the stop pin 37. This pin also prevents the pointer 10 from moving more than one line below the upper zero point on the scale. During the rough measuring, when only the pointer 10 moves, the measuring pressure is determined by the tension of the spring 35, but during the accurate measuring, when both pointers move, the measuring pressure is determined by the difference between the tensions of the two springs 35 and 36. The spring 35 must therefore be stronger than the spring 36.

The gauge is primarily intended to be used for measuring internal dimensions, for instance the diameter of a hole. By the insertion of the lever 38 between the measuring stud 5 and the two pointers the advantage above referred to is attained that the gauge may be used for measuring also long or deep holes of small diameter. The gauge may easily be changed, however, in such manner that it will also be serviceable for external measurements. Fig. 5 illustrates a modification of the gauge shown in Fig. 3 adapted for external measurements. This embodiment differs from the one illustrated in Fig. 3 only in that the arm 33ª which supports the measuring stud 4, is located on the same side of the body 1 as that on which the sliding measuring stud 5 projects. The stud 4 is thus directed towards the stud 5, so that the object to be measured, may be introduced between said studs. In other respects this gauge is constructed similarly to that shown in Fig. 3, and similar reference numerals are used to denote similar parts. As regards the indications on the scale it is to be noted that in respect of internal measures the lines between the two zero points of the scale denote minus or undersize allowances, whereas in respect of external measures said lines denote plus or over-size allowances.

I claim:

1. In a gauge the combination of a frame, two measuring studs in said frame, one of said studs being adapted to slide in said frame, a rough measurement pointer actuated by said sliding stud, a scale for said pointer having a zero point, an accurate measurement pointer, and means adapted to transmit motion from said sliding stud to said accurate measurement pointer only when said rough measurement pointer moves in the vicinity of the zero point on the scale, such movement of said accurate measurement pointer being at greater angular velocity than the movement of said rough measurement pointer.

2. In a gauge the combination of a frame, two measuring studs in said frame, one of said studs being adapted to slide in said frame, a rough measurement pointer actuated by said sliding stud, a scale for said pointer having a zero point, an accurate measurement pointer, a stop for said accurate measurement pointer, a spring tending to turn said accurate measurement pointer against said stop, and motion-multiplying connection between said sliding measuring stud and said accurate measurement pointer adapted to transmit motion from said sliding stud to and to turn said accurate measuring pointer against the action of said spring when said rough measurement pointer is in the vicinity of the zero point on said scale, such movement of said accurate measurement pointer being at greater angular velocity than the movement of said rough measurement pointer.

3. In a gauge the combination of a frame, two measuring studs in said frame, one of said studs being adapted to slide in said frame, two measuring pointers, a scale for said pointers having a zero point, a common pivot for said pointers, a lever one arm of which engages said sliding stud and the other arm of which engages at different points of its length said two pointers in such manner as to cause said pointers to turn with different angular velocities and to transmit motion to one of said pointers only when the other of said pointers moves in the vicinity of the zero point on said scale.

4. In a gauge the combination of a frame, two measuring studs in said frame, one of said studs being adapted to slide in said frame, two measuring pointers, a scale for said pointers having a zero point, a common pivot for said pointers, a lever, slides at both ends of said lever adjustable in the longitudinal direction of the same, each slide having an edge, one of said edges engaging said sliding stud, and the other of said edges and a surface on said lever engaging said two pointers in such manner as to cause said pointers to turn with different angular velocities and to transmit motion to one of said pointers only when the other of said pointers moves in the vicinity of the zero point on said scale.

5. In a gauge the combination of a frame, two measuring studs in said frame, one of said studs being adapted to slide in said frame, two measuring pointers, a scale for said pointers having a zero point, and means transmitting motion from said slidable measuring stud to said pointers in such manner as to cause said pointers to turn with different angular velocities and to operate one of said pointers only when the other of said pointers moves in the vicinity of the zero point on said scale.

6. In a gauge the combination of a frame, two measuring studs in said frame, one of said studs being adapted to slide in said frame, a rough measurement pointer, a scale for said pointer having a zero point, an accurate measurement pointer, and a motion-multiplying connection between said sliding measuring stud and said accurate measurement pointer adapted to transmit motion from said sliding stud to said accurate measurement pointer only when said rough measurement pointer moves in the vicinity of the zero point on the scale, such movement of said accurate measurement pointer being at greater angular velocity than the movement of said measurement pointer.

7. In a gauge the combination of a frame, two measuring studs in said frame, one of said studs being adapted to slide in said frame, two measuring pointers, a scale for said pointers having a zero point, a lever one arm of which engages said sliding stud and the other arm of which engages at different points of its length said two pointers in such manner as to cause said pointers to turn with different angular velocities and to transmit motion to one of said pointers only when the other of said pointers moves in the vicinity of the zero point on said scale.

8. In a gauge the combination of a frame, two measuring studs in said frame, one of said studs being adapted to slide in said frame, two measuring pointers, a scale for said pointers having a zero point, a lever, one arm of which engages said sliding stud and the other arm of which engages at different points of its length said two pointers in such manner as to cause said pointers to turn with different angular velocities and to transmit motion to one of said pointers only when the other of said pointers moves in the vicinity of the zero point on said scale, the ends of said lever being adjustable to vary the effective length thereof.

9. In a gauge, the combination of a frame, two measuring studs carried by said frame, one of said studs being movable with reference to said frame, a rough measurement pointer actuated by said movable stud, a scale for said pointer having a zero point, an accurate measurement pointer, and means adapted to transmit motion from said movable stud to said accurate measurement pointer only when said rough measurement pointer moves in the vicinity of the zero point on the scale, such movement of said accurate measurement pointer being at greater angular velocity than the movement of said rough measurement pointer.

10. A gauge comprising a frame, two contact members carried by said frame, one of which is movable, a scale, two pointers movable thereover by said movable contact member, and means co-operating with said movable member and with said two pointers whereby the latter jointly indicate the desired reading.

11. A gauge comprising a frame, two contact members carried by said frame, one of which is movable, a scale, two pointers movable thereover by said movable contact member, and means co-operating with said movable member and with said two pointers whereby the latter jointly indicate the desired reading, one of said pointers being movable through a greater arc than the other for giving a finer reading than said other.

12. A device of the class described comprising two pivotally mounted pointers having a common axis of rotation, means arranged to act on said pointers at different distances from said axis, and a pair of relatively movable contact members, one of which co-operates with said means, whereby the distance between the contacting surfaces of said members is represented by two readings.

13. In a device of the class described, two pointers having a common scale, means normally impelling said pointers in one direction to avoid backlash, a pair of relatively movable contact members, connections between one of said members and one of said pointers, and connections between said first mentioned connections and the other of said pointers whereby both pointers are actuated by said last mentioned contact member in opposition to said impelling means.

14. In a device of the class described, a frame having a scale, two pointers each pivotally mounted on said frame, a movable contact member, connections between the same and one of said pointers to move the latter over said scale, a spring impelling said pointer in the opposite direction, a stop for the second pointer, a spring normally impelling said pointer toward said stop, a projection on one of the movable elements operating in connection with said first pointer which projection engages a surface on said second pointer after a predetermined movement of said first pointer, said surface being so spaced from the pivotal support of said second pointer as to move the latter a definite multiple of the simultaneous movement of said first pointer.

CARL EDVARD JOHANSSON.